United States Patent
Boucadair et al.

(10) Patent No.: US 8,451,845 B2
(45) Date of Patent: May 28, 2013

(54) METHOD OF RECEIVING A DATA PACKET IN AN IPV6 DOMAIN, AN ASSOCIATED DEVICE AND AN ASSOCIATED HOME GATEWAY

(75) Inventors: Mohamed Boucadair, Rennes (FR); Jean-Luc Grimault, Mondeville (FR)

(73) Assignee: France Telecom, Paris (FR)

( * ) Notice: Subject to any disclaimer, the term of this patent is extended or adjusted under 35 U.S.C. 154(b) by 275 days.

(21) Appl. No.: 13/001,907

(22) PCT Filed: Jun. 26, 2009

(86) PCT No.: PCT/FR2009/051228
§ 371 (c)(1),
(2), (4) Date: Dec. 29, 2010

(87) PCT Pub. No.: WO2010/004180
PCT Pub. Date: Jan. 14, 2010

(65) Prior Publication Data
US 2011/0110375 A1    May 12, 2011

(30) Foreign Application Priority Data
Jun. 30, 2008    (FR) ..................................... 08 54405

(51) Int. Cl.
*H04L 12/28*    (2006.01)
(52) U.S. Cl.
USPC .......................................... 370/393; 370/401
(58) Field of Classification Search
USPC ........................... 370/389, 392, 393, 401, 466
See application file for complete search history.

(56) References Cited

U.S. PATENT DOCUMENTS

| | | | | |
|---|---|---|---|---|
| 7,245,622 B2* | 7/2007 | Huitema | ........................ | 370/392 |
| 7,551,632 B2* | 6/2009 | Thubert et al. | ................ | 370/401 |
| 2005/0286553 A1* | 12/2005 | Wetterwald et al. | .......... | 370/466 |

FOREIGN PATENT DOCUMENTS

| | | |
|---|---|---|
| EP | 1 420 559 A1 | 5/2004 |
| WO | WO 2004/039014 A1 | 5/2004 |
| WO | WO 2007/099248 A2 | 9/2007 |
| WO | WO 2008/001007 A2 | 1/2008 |

OTHER PUBLICATIONS

Afifi et al., "Methods for IPv4-IPv6 Transition," IEEE International Symposium on Computers and Communications, Red Sea, Egypt Jul. 6-8, 1999, Proceedings, Los Alamitos, CA, USA, IEEE Comput. Soc., US, pp. 478-484 (Jul. 6, 1999).

Kawarasaki et al., "IPv4/IPv6 SIP interworking methods in dual-stack network," The 9th Asia-Pacific Conference on Communications, 2003, APCC 2003, Sep. 21-24, 2003, Piscataway, NJ, USA, IEEE, vol. 3, pp. 1124-1128 (Sep. 21, 2003).

Park et al., "Network Address Translation—Protocol Translation (NAT-PT); draft-daniel-natpt-bis-01.txt," Internet Engineering Task Force, IETF, pp. 1-21 (Oct. 22, 2005).

(Continued)

*Primary Examiner* — Hong Cho
(74) *Attorney, Agent, or Firm* — Drinker Biddle & Reath LLP

(57) ABSTRACT

A method of receiving an IPv6 data packet in an IPv6 domain connected to an IPv4 domain, said packet comprising an IPv6 destination address and an IPv6 source address. The method comprises the following steps: identifying an IPv6 destination address constructed by concatenating an operator prefix, an IPv4 destination address, and a destination port number; if necessary, regularizing at least one address of the data packet and modifying the data packet; and routing the modified data packet to its destination.

10 Claims, 9 Drawing Sheets

OTHER PUBLICATIONS

Shin et al., "Ports Option Support in Dual Stack Transition Mechanism (DSTM)," The 6$^{th}$ International Conference on Advanced Communication Technology, Phoenix Park, Korea, Feb. 9-11, 2004, Piscataway, NJ, USA, IEEE, vol. 1, pp. 225-228 (Feb. 9, 2004).

Srisuresh et al., "RFC 2663—IP Network Address Translator (NAT) Terminology and Considerations," Network Working Group, retrieved from internet website: http://www.ietf.org/rfc/rfc2663.txt, pp. 1-30 (1999).

* cited by examiner

METHOD OF RECEIVING A DATA PACKET IN AN IPV6 DOMAIN, AN ASSOCIATED DEVICE AND AN ASSOCIATED HOME GATEWAY

CROSS-REFERENCE TO RELATED APPLICATIONS

This application is the U.S. national phase of the International Patent Application No. PCT/FR2009/051228 filed Jun. 26, 2009, which claims the benefit of French Application No. 08 54405 filed Jun. 30, 2008, the entire content of which is incorporated herein by reference.

FIELD OF THE INVENTION

The field of the invention is that of telecommunications networks, in particular IP telecommunications networks transporting data packets from a source equipment identified by a source address to a destination equipment identified by a destination address.

BACKGROUND

This kind of telecommunications network combines a plurality of equipments, connections, and functions dedicated to transporting data coming from terminal equipments connected to the network. In particular, the transport functions may be implemented by activating routing and transmission protocols. A telecommunications network administered by an operator is also referred to as a domain.

An IP connectivity service provider deploys a dedicated architecture to enable terminal equipment users to be contacted. Access to the IP connectivity service is managed by the service provider using the telecommunications network of an operator to route data packets sent by the terminal equipments to their final destinations. In some circumstances, said service provider is also the telecommunications network operator.

This kind of service provider assigns an IP address, generally a public IP address, to a home gateway between a home network and the public network or IP domain of the operator. The home gateway generally assigns private IP addresses to the terminals of its home network.

Below, the expression "home gateway" refers to any equipment for interconnecting a private network and a network operated by a service provider, the private network being either a home network or a business network.

The network operated by the service providers is also referred to below as a public network.

Located on the path of data packets between a terminal of its private home network and the IP domain of the operator, the home gateway includes, as known in the art, a table in which it associates the private IP address and the port associated with that terminal with a public IP address of Ipv4 type and, with a port of the same gateway on the public network.

This table is known to the person skilled in the art as a NAT (network address translation) table. There are different types of network address translation e.g. symmetrical, Full Cone, and Port Restricted.

It is commonly accepted in the IP service provider community that IPv4 public addresses are going to run out. To avoid this problem the community has in the past taken action leading to the definition of a new protocol known as the Internet Protocol version 6 (IPv6). This new version of the Internet Protocol provides a large number of IP addresses and a hierarchical routing mechanism offering improved performance. Providers are not indifferent to warnings recently emanating from the Internet Engineering Task Force (IETF), notably in reports presented to the Global Routing Operations Working Group (GROW) concerning the risk of the Internet Assigned Numbers Authority (IRNA) running out of IPv4 addresses by the end of 2010.

However, in practice, this IPv6 solution has not as yet been widely adopted by operators, for financial, strategic, and technical reasons linked to managing the complexity of transition and migration.

To limit the number of IPv4 public addresses necessary to provide an IP connectivity service to an installed base of clients, a solution known as Double NAT or Operator NAT has been proposed and implemented. It entails activating a NAT function within the telecommunications network of the operator so that the home gateways use a private address (instead of a public address) in their outgoing NAT tables. Thus the Operator NAT function translates home gateway private addresses into public addresses, which enables a service provider to economize on a non-negligible number of IPv4 public addresses required to provide the IP connectivity service.

The Operator NAT solution has drawbacks including:
 IP data packet processing is made more complex; because of the introduction of a second level of address translation, data packets must be modified twice;
 the necessity to adapt the implementation of conventional Application Level Gateway (ALG) signaling protocols such as the Domain Name System (DNS) protocol, the File Transfer Protocol (FTP), and the Session Initiation Protocol (SIP). Taking the SIP, for example, to keep the NAT table of a home gateway up to date, setting up and maintaining a voice over IP session requires frequent exchanges of signaling between the user terminal and the public network via re-registration requests so that the NAT sessions remain active; with Double NAT, such a mechanism must also be provided in the equipment hosting the Operator NAT function; furthermore, the public address and the public port actually being used for the terminal must be communicated to the SIP application;
 the public telecommunications network operator offering a degraded IP connectivity service can only be deplored, in particular because functions such as port forwarding and DynDNS are not supported in Operator NAT.

What is more, such a solution cannot prevent, but can only delay, the phenomenon of IPv4 addresses running out. It is therefore necessary to provide for a changeover to IPv6 in the medium term. Such a changeover will necessarily lead to a period of transition during which IPv6 domains will have to interconnect with IPv4 domains. There is no provision in current networks for facilitating such interconnection efficiently, optimally, and without instantiation of additional states in the network nodes used to provide an IP connectivity service.

Nor is there any provision for progressive migration from IPv4 addressing to IPv6 addressing based on simple interconnection mechanisms between an IPv6 and an IPv4 domain, in particular solutions that do not require client terminals implementing both IPv4 and IPv6.

SUMMARY

The invention improves upon the above situation by providing a receiving method for receiving an IPv6 data packet in an IPv6 domain connected to an IPv4 domain, said packet including an IPv6 destination address and an IPv6 source address.

According to the invention, said method is executed in a home gateway adapted to connect a user terminal to said IPv6 domain and includes the following steps:

identifying an IPv6 destination address constructed by concatenating an operator prefix, an IPv4 destination address and a destination port number;

if necessary, regularizing at least one address of the data packet by replacing said address, the replacement process belonging to a group comprising replacement of a constructed address with a native address and replacement of a native address with a constructed address, and modifying the data packet using the regularized address; and routing the modified data packet to its destination.

In the context of migration from IPv4 to IPv6, consider a first terminal equipment of an IPv4 domain that can send and receive only IPv4 data packets. In parallel with this, a second terminal equipment of the IPv6 domain can send and receive only IPv6 data packets. According to the invention, if one of these equipments is seeking to send a data packet to the other, it uses its own protocol, but the data is routed in the IPv6 domain using the IPv6 protocol.

The data packet is therefore sent in IPv4 or IPv6, transformed if necessary into an IPv6 data packet to route it in the IPv6 domain, and if necessary transformed back into an IPv4 data packet.

Such transformation relies on a mechanism for constructing an IPv6 destination address from an IPv4 destination address of the first terminal by concatenating an operator prefix, this IPv4 destination address, and the packet destination port number. Considered the situation where an equipment for interconnecting the IPv6 domain and the IPv4 domain constructs an IPv6 destination address from the IPv4 destination address and the destination port. The constructed IPv6 destination address can be routed in the IPv6 domain and contains the payload information carried by the IPv4 data packet.

This transformation requires the second user terminal, although using the IPv6 protocol, to have available a "dummy" IPv4 address, which may be its own IPv4 address or that of a home gateway that administers a home network to which it is connected. This address, used as the destination address of an IPv4 packet coming from the IPv4 domain, is used by the interconnection equipment to construct the IPv6 destination address referred to above.

Conversely, it is possible to retrieve the IPv4 address and the source port number from an IPv6 address constructed using such a mechanism (i.e. conforming to the IPv6 address construction formalism just referred to). It is therefore unnecessary to store an IPv4 to IPv6 address translation table or to maintain states relating to sessions in the access node (interconnection node) of both the IPv4 and IPv6 domains. The invention therefore makes it possible, in the IPv4 to IPv6 direction and in the IPv6 to IPv4 direction, to route the IPv4 data packet towards its destination in the form of an IPv6 data packet and to deliver payload information contained in the packet towards its destination without having recourse to state tables that are laborious to maintain.

Thus neither the IPv6 user terminal receiving or sending the data packet, nor, where applicable, the home gateway that manages it, nor the routers responsible for routing the packet to its destination need to interpret the IPv4 protocol.

However, for it to be possible to route the IPv6 data packet resulting from such a transformation like a native IPv6 packet, it is necessary to verify its source and destination addresses against the IPv6 address construction formalism referred to above. The method of the invention therefore proposes a solution identifying the destination or the source of the packet as belonging to an IPv4 domain and consequently applying to it appropriate verification processing.

According to one aspect of the invention, when the data packet comes from said user terminal and goes to the IPv4 domain, the step of regularizing the source address further includes the following steps:

identifying an IPv6 native source address;

creating an entry in an address translation table, said entry associating said native source address with a source address constructed by concatenating an operator prefix, an IPv4 address assigned to the gateway, and a source port number belonging to a range of port numbers authorized for said gateway; and replacing the native source address of the data packet with the constructed source address.

This relates to an outgoing call. If a constructed destination address has been identified, it may be deduced that the data packet is for a user terminal of the IPv4 domain. In this situation, its source address must be a constructed address in order for an IPv6/IPv4 domain interconnection equipment to be able thereafter to recover the source IPv4 address and to transform the IPv6 data packet back into an IPv4 data packet. If no processing is effected, it is not possible for the interconnection node to process the packet, since the native source address contains no information relating to the IPv4 source address, i.e. the dummy IPv4 address of the terminal that sent the packet.

If the source address is a native source address, the method of the invention makes it possible to replace it with a constructed source address belonging to a prefix or IPv6 source address range authorized for the gateway.

In expectation of receiving a response to this data packet, an association between the native source address and the constructed source address is added to an address translation table of the home gateway.

Thus a response data packet may be routed to the user terminal of the home network that sent the first data packet.

An advantage of the invention is that it enables an IPv6 user terminal to use the source address of its choice to send data packets to an IPv4 domain, as the gateway of the invention does what is necessary for the packets to be routed to their destination.

According to one aspect of the invention, address identification uses an identifier contained in the destination address.

This identifier may have different values depending on whether it is a native IPv6 address or an IPv6 address constructed from an IPv4 address. One advantage of this is making it possible to identify the nature of the address of the data packet simply and quickly. This kind of solution also enables mutualisation of IPv4/IPv6 interconnection equipments between operators.

According to another aspect of the invention, the receiving method further includes a step of verifying that the source port number of the data packet and the source port number of the constructed source address match.

The data packet contains indeed a source port number in the transport layer of the ISO model. For a response to be routed by the network to the terminal that sent the first packet, it is important for this transport level source port number to match with the source port number contained in the constructed source address of the data packet. If this is not so, the method of the invention enables matching of the two source port numbers.

Note that the verification step and the source address regularization step may be carried out simultaneously. For example, choosing a constructed source address in the prefix of the gateway may incorporate the constraint of having a source port number equal to the transport level source port number.

According to one aspect of the invention, when the data packet comes from the IPv4 domain and goes to a user terminal connected to the IPv6 domain by said home gateway, the step of regularizing the destination address comprises the following steps:

searching an address translation table of said gateway for an entry associating with said destination address a native destination address;

if an entry is found, replacing the constructed destination address of the data packet with the native destination address from that entry.

Note that the destination port number is also replaced by that in the port and address translation table maintained by the home gateway.

The above remarks relate to an incoming call. The IPv6 data packet was constructed from an IPv4 packet by an equipment for interconnecting the IPv6 domain and the IPv4 domain. It may be a response to a data packet sent beforehand by the user terminal connected to the home gateway. The gateway therefore consults its address translation table. If it finds therein an association between the destination address extracted from the received data packet and an IPv6 native destination address, it replaces the constructed destination address and potentially the constructed destination port number of the data packet with the IPv6 native address of this table entry and routes the modified packet to the destination terminal.

According to another aspect of the invention, the receiving method further includes a step of verifying that the destination port number of the data packet and the destination port number contained in the constructed destination.

Such verification makes it possible to be sure that the destination port number of the data packet at the transport level coincides with the number from the constructed destination address of the packet. This verification is of particular benefit if the dummy IPv4 address assigned to the home gateway is shared with a other terminals or home gateways. In this situation, discriminating between these equipments is based on the range of port numbers used. According to the invention, a packet sent by the IPv4 terminal to said dummy address may be routed to the gateway concerned without encountering any routing problems.

The receiving method may be used in a device for receiving a data packet in an IPv6 domain connected to an IPv4 domain, said packet including an IPv6 destination address and an IPv6 source address, characterized in that it includes the following steps:

identifying an IPv6 destination address constructed by concatenating an operator prefix, an IPv4 destination address, and a destination port number;

if necessary, regularizing at least one address of the data packet and modifying the data packet using the regularized address; and routing the modified data packet to its destination.

In one particular implementation of the invention, the steps of the method of receiving a data packet are determined by computer program instructions.

Consequently, the invention also provides a computer program on an information medium, adapted to be executed in a receiving device or more generally in a computer, this program including instructions for executing the steps of a sending, receiving or routing method as described above.

This program may use any programming language and take the form of source code, object code or a code intermediate between source code and object code, such as a partially-compiled form, or any other desirable form.

The invention also provides a computer-readable information medium containing instructions of a computer program as referred to above.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of the invention can in particular be downloaded over an Internet-type network.

Alternatively, the information medium may be an integrated circuit in which the program is incorporated, the circuit being adapted to execute the method in question or to be used in its execution.

The invention further provides a home gateway adapted to connect user terminals to an IPv6 domain connected to an IPv4 domain.

According to the invention such a gateway includes:

means for obtaining an IPv4 address, a range of port numbers authorized for said gateway, and a range of IPv6 addresses authorized for said gateway, said range of IPv6 addresses being constructed by concatenating an operator prefix, said IPv4 address, and the range of authorized IPv4 port numbers; and a device of the invention for receiving an IPv6 data packet in the IPv6 domain connected to the IPv4 domain.

According to the invention, such a gateway processes only IPv6 data packets. However, it is assigned an IPv4 address, so that it may be identified and contacted by senders in the IPv4 domain. Said address is not used by the home gateway to send IP packets.

The home gateway may hold an address translation table containing entries associating at least one source address for a communications session involving a user terminal of its home network. According to the invention, said gateway is adapted to store in said entry an IPv6 constructed source address and an IPv6 native source address.

BRIEF DESCRIPTION OF THE DRAWINGS

Other advantages and features of the invention become more clearly apparent on reading the following description of one particular implementation of the invention, provided by way of illustrative and non-limiting example only, and the appended drawings, in which.

DETAILED DESCRIPTION

Figure 1:
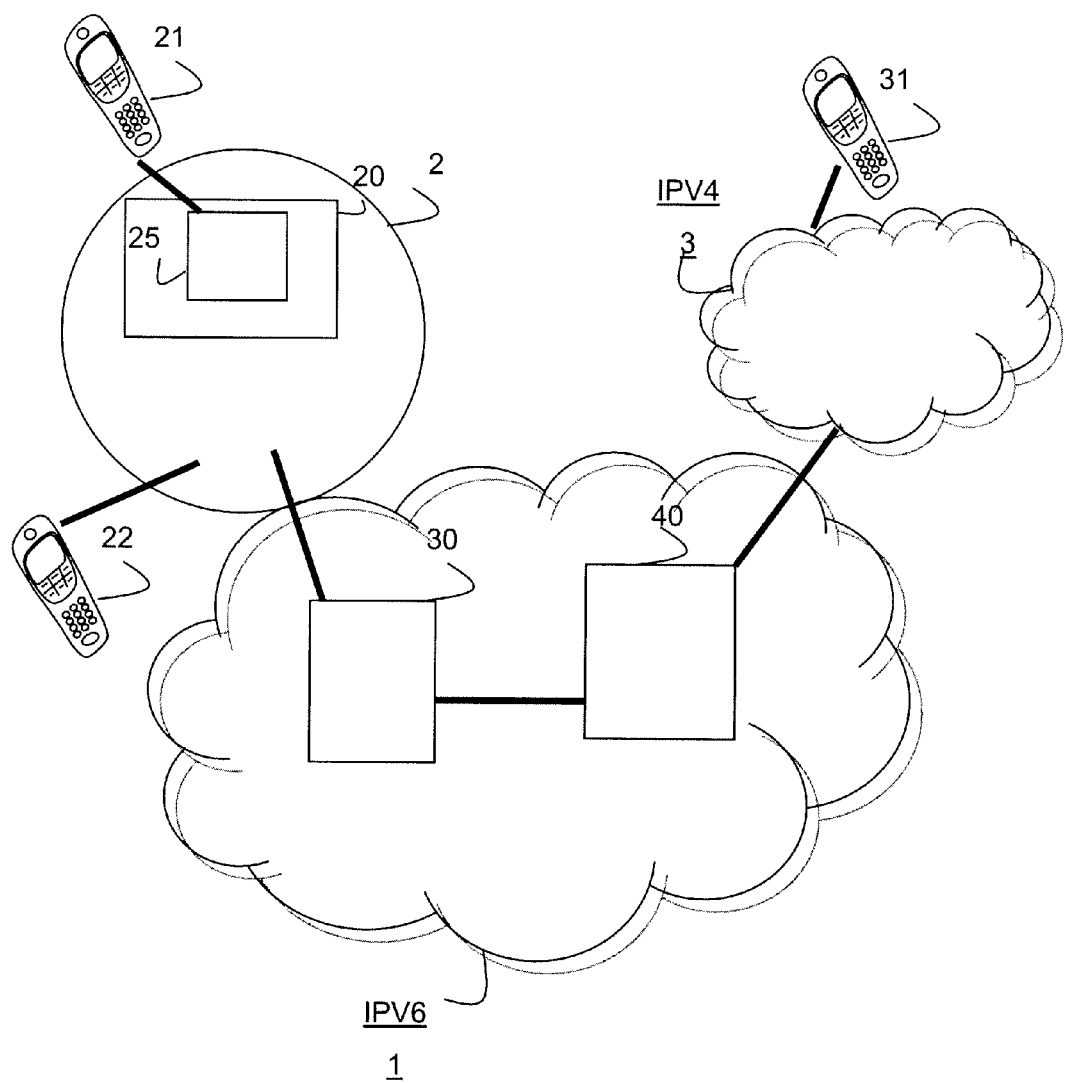
FIG. 1 shows diagrammatically an IPv6 domain and an IPv4 domain interconnected according to the invention.

The general principle of the invention relies on constructing an IPv6 address from an IPv4 address, a predetermined operator prefix, and a port number. This enables transformation of an IPv4 packet entering an IPv6 domain and an IPv6 packet leaving an IPv6 domain to go to an IPv4 domain without it being necessary to maintain a table of correspondence between the IPv4 and IPv6 addresses in an access node to the IPv6 domain.

It will be recalled that IPv6 addresses comprise 16 bytes (128 bits), compared to the 4 bytes (32 bits) of IPv4 addresses. There is therefore an extremely large potential number of IPv6 addresses compared to the number of IPv4 addresses. An IPv6 address has two parts:

a left-hand part (the prefix) that identifies a subnetwork of the domain;
a right-hand part that identifies a machine connected to the subnetwork.

The longest prefixes assigned to a subnetwork are generally "/64" prefixes, i.e. contain 64 bits for identifying the subnetwork. The right-hand 64 bits of the address are then used to identify a particular machine belonging to the subnetwork. Shorter prefixes (for example "/56" or even "/48") enable identification of larger subnetworks, themselves often including "/64" subnetworks. Nevertheless, there is nothing in the IPv6 standard to prohibit the use of prefixes longer than "/64" and it is therefore possible to conceive of a "/116" prefix, for example, identifying a subnetwork that may include 4096 machines.

Note that the only restriction on prefixes longer than "/64" is simply that the machines behind the corresponding subnetwork will not be able to use the autoconfiguration mechanism described in Document RFC 2462. This mechanism enables a machine knowing its level 2 address (for example its MAC Ethernet address) to configure for itself, subject to certain conditions, the right-hand 64 bits of its IPv6 address, deriving its level 2 address therefrom using a precise algorithm. This autoconfiguration mechanism is not obligatory, however, and other mechanisms may be preferable, for example that corresponding to the DHCPv6 protocol (see RFC 3315) that among other things makes it possible to obtain an IPv6 address from a DHCPv6 server.

Turning now from a simple IPv6 machine to an IPv6 router (for example an IPv6 home gateway), it is known that such an equipment must have one or more IPv6 prefixes representing the subnetworks whose packets it routes. An IPv6 router must therefore be configured with one or more prefixes.

An extension of the DHCPv6 protocol enables a router requiring one or more IPv6 prefixes (for example a home gateway) to request them from an equipment that is able to delegate prefixes (typically an upstream router). This extension is described in RFC 3633 (IPv6 Prefix Options for Dynamic Host Configuration Protocol (DHCP) version 6) and specifies an identity association for a prefix delegation option in DHCPv6 messages for passing on the delegated prefix or prefixes. Once the requesting router has been delegated one or more IPv6 prefixes, it routes all IPv6 packets going to or coming from machines whose addresses are inscribed the prefix or prefixes that it manages.

There is described below with reference to FIG. 1 an IPv6 domain 1 and an IPv4 domain 3 or IPv6/IPv4 access node 40 to an IPv4 domain 3 and an access router 30 adapted to route data packets going to or coming from a home gateway 20 connected to the IPv6 domain 1. This kind of gateway administers a home network 2 to which the terminals 21 and 22 are connected.

In the context of the invention, a home gateway is considered that implements only the IPv6 protocol. Accordingly, such a gateway is able to process (in particular to send and receive) only IPv6 data packets.

The terminals 21 and 22 are also mono-version IPv6 (or pure IPv6) terminals, meaning that they implement only the IPv6 protocol. How the invention enables interconnection of an IPv6 domain and at least one IPv4 domain for IPv6 terminals is described below.

The following "hybrid" circumstances are considered:
routing an incoming IPv4 data packet sent by a user terminal of the IPv4 domain 3 to a user terminal 21, 22 of the home network of the gateway 20 connected to the IPv6 domain 1; and
routing an outgoing IPv6 data packet sent by a user terminal 21, 22 of the IPv6 domain 1 to a user terminal of the IPv4 domain 3.

The details of sending pure IPv6 or pure IPv4 packets being known to the person skilled in the art, they are not described in more detail here.

To be able to connect to the IPv6 domain or network, the home gateway has IP connectivity elements provided by the connectivity service provider.

However, note that the invention is not limited to access to the IP connectivity service (Internet or Intranet, for example) via a home gateway, but also applies to user terminals in other Internet or Intranet network access contexts. One example is access to the IP connectivity service from a simple mobile terminal of a mobile network or from a sophisticated mobile terminal that could serve as a gateway, communicating with other terminals in its local area network, for example via Bluetooth.

According to the invention, the home gateway 20 has the following IP connectivity elements:
a standard IPv4 address below designated "@IPv4"; if the gateway hosts in its home network pure IPv6 client terminals, this IPv4 address is referred to as a "dummy" address because it is not used by the gateway to send/receive IP traffic; the invention uses it to construct IPv6 addresses (see below);
a range of authorized port numbers (ports_pattern/length_of_unvariable);
a constructed IPv6 address prefix (IPv6_prefix_ports_range); and
a native IPv6 address prefix (IPv6 prefix native); this second prefix is not mandatory, however; the constructed IPv6 prefix is sufficient on its own.

The @IPv4, IPv6_prefix_ports_range and IPv6_prefix_native elements are standard information elements in the usual IPv4 and IPv6 context.

According to the invention, the information element IPv6_prefix_ports_range intrinsically contains the elements @IPv4 and ports_pattern/length_of_unvariable.

In one implementation of the invention, the IPv4 address @IPv4 is an address shared@IPv4 that is shared by a plurality of home gateways of the IPv6 domain 1 and the range of authorized port numbers for the home gateway 20 is a range of port numbers reserved for that gateway.

Clearly sharing the public address shared@IPv4 between home gateways makes it possible to economize on the number of IPv4 addresses used and to delay the phenomenon of running out of addresses. Moreover, its use is justified by the need to interconnect IPv4 domains and IPv6 domains. This interconnection is generally effected by means of representation addresses. If the installed base of IPv6 clients is large, then many IPv4 representation addresses are required.

The various home gateways that share the same address shared@IPv4 are uniquely identified by the port numbers that they use as each of them has the benefit of a range of contiguous port numbers, undoubtedly small, but nevertheless reserved to it.

The invention proposes interconnecting IPv6 and IPv4 domains in a manner that requires the assignment of IPv4 addresses to function and thus ensures in a transparent manner continuity of connectivity between heterogeneous terminals (i.e. terminals implementing different addressing protocols, such as IPv4 and IPv6).

An advantage of the implementation of the invention in which the IPv4 addresses are shared is therefore to facilitate migration to IPv6 addressing at the same time as economizing on IPv4 addresses. In a context of transition between the IPv4 and IPv6 addressing modes, this can advantageously make it possible to avoid a penury of addresses until migration is completed. Another advantage is an immediate return on the investment in IPv6 plant (because the use of IPv6 capacity depends not on the behavior of the clients but on the operator).

In the remainder of the description the IPv4 address assigned to the gateway 20 is a shared address shared@IPv4.

Referring to FIG. 1, the home gateway 20 is connected to the network of the operator via an access router 30. This is the first router that the IPv6 and IPv4 data packets encounter when they leave the home gateway.

According to the network architecture adopted at the IPv6 routing level, the access router 30 may advertise in the upstream direction of the network (i.e. towards the network 1 of the IP connectivity service provider) the IPv6 prefixes that it routes, i.e. the prefixes IPv6_prefix_ports_range and IPv6_prefix_native of the home gateways that it serves.

The access router 30 obtains the IPv6 prefixes of the home gateways that it serves in a manner that is entirely conventional in an IPv6 network environment. Two methods are described below:

1) it receives IPv6 routing advertisements (IPv6_prefix_ports_range and IPv6_prefix_native) from the home gateways that it serves; to this end each home gateway advertises its prefixes (IPv6_prefix_ports_range and IPv6_prefix_native) in the upstream direction; or 2) it obtains IPv6_prefix_ports_range and IPv6_prefix_native by prefix delegation as described in RFC 3633 (IPv6 Prefix Options For Dynamic Host Configuration Protocol (DHCP) version 6).

Figure 2:
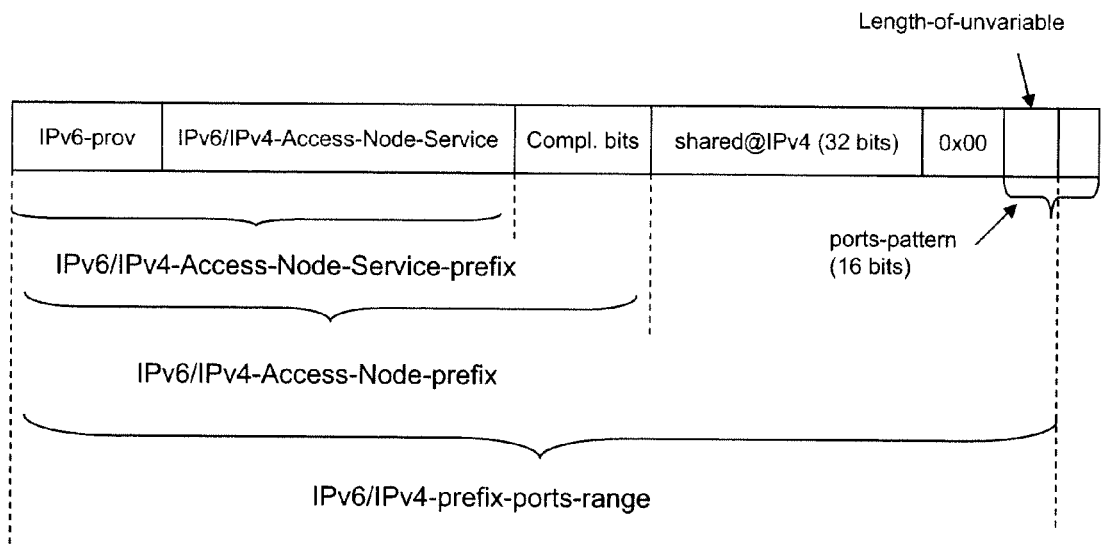
FIG. 2 shows the structure an IPv6 address prefix constructed according to the invention.

An example of an IPv6 address prefix constructed in accordance with the invention, such as the prefix IPv6_prefix_ports_range assigned to the home gateway 20, is described below with reference to FIG. 2.

This IPv6 prefix combines the bits of the IPv4 public address shared_@IPv4 and the range of authorized port numbers (ports_pattern/length_of_unvariable) for the gateway 20 and makes it possible to route the incoming IPv6 packet to the destination home gateway unambiguously. It is an IPv6 prefix that is routable in an IPv6 network. It could even be routed in the IPv6 network if it were chosen to be a prefix inscribed in the prefix of the network operator providing the home gateway (especially if it were advertised in the Border Gateway Protocol (BGP)). In the FIG. 2 example, this prefix comprises, from left to right:

the IPv6 prefix assigned to the access node 40: IPv6/IPv4_Access_Node_prefix; this prefix is advantageously chosen so that it is inscribed in the IPv6 operator prefix IPv6-prow assigned to the IP connectivity service provide by its Regional Internet Registry (RIR) and thus includes this operator prefix in its first bits;

the bits IPv6/IPv4_Access_Node_Service identifying the interconnection service IPv6/IPv4_Access_Node to the operator according to the present invention; the sequence made up of the bits of the operator prefix followed by the bits IPv6/IPv4_Access_Node_Service constitute the prefix IPv6/IPv4_Access_Node_Service_prefix that identifies the service;

complementary bits identifying a particular access node IPv6/IPv4_Access_Node serving the home gateway; for load-balancing reasons, the prefix IPv6/IPv4_Access_Node_prefix may not be specific to only one access node;

the 32 bits of the address shared@IPv4 of the gateway 20;

optionally, 8 reserved bits set to 0; this byte may be used to distinguish between the different types of port (UDP, TCP, SCTP, etc.); it could take the value "X" for UDP processing, "Y" for TCP processing, etc.;

the 16 bits representing the range of port numbers authorized for the gateway (ports_pattern), with a meaningful invariant part on the left in these 16 bits (the more significant bits), of length length_of_unvariable; note that if the IPv4 address of the gateway 20 is not shared by a plurality of home gateways, the range of authorized port numbers is of maximum and identical size for all the gateways.

The length of the prefix IPv6_prefix_ports_range is established as follows: [128−16(length of an IPv6 address−port coding address)=112 bits plus length_of_unvariable (length of invariant bits representing the range of authorized source ports).]

Note that the prefix IPv6_prefix_ports_range constructed according to the invention is longer than the prefixes recommended by the IPv6 standard for IPv6 deployment. It nevertheless conforms to the IPv6 standards.

The IPv6 domain 1 described with reference to FIG. 1 includes at least one access node 40 of the invention. Note that it may include other access nodes of the invention. The access node 40 (IPv6/IPv4_Access_Node) is a particular Dual-Stack (IPv4 and IPv6) router, i.e. it implements both the IPv4 protocol and IPv6 protocol.

The access node 40 (IPv6/IPv4_Access_Node) in the network 1 is typically upstream of the access router or routers 30 (i.e. towards the network core in an interconnection segment with adjacent networks), as shown in FIG. 1. Said access node is also referred to as an interconnection node.

Figure 3:
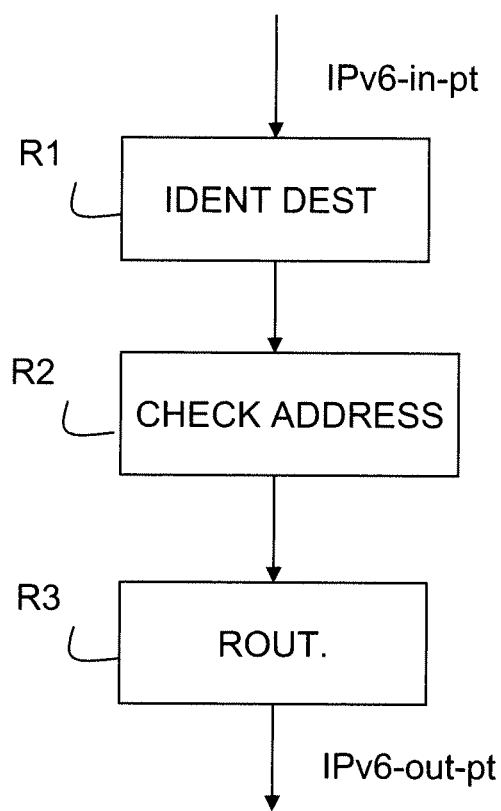
FIG. 3 shows diagrammatically steps of the method of receiving data packets in an IPv6 domain interconnected according to the invention with an IPv4 domain.

The method of receiving an IPv6 data packet in the IPv6 domain is described below with reference to FIG. 3. It is advantageously executed by a receiver device included in a home gateway connected to the IPv6 domain, such as the gateway 20, and processes data packets coming from the home gateway 2 and data packets coming from the IPv4 domain 3. This kind of method includes a step R1 of identifying the IPv6 destination address as being a IPv6 native destination address or an IPv6 destination address constructed by concatenating an access node prefix, an IPv4 destination address, and a destination IPv4 port number. It is assumed here that the gateway 20 has obtained this prefix beforehand, for example through configuration.

It then includes a step R2 of regularizing an address of the data packet. In the direction from the home gateway to an IPv6 domain, this address is the source address of the packet; in the direction from the IPv6 domain to a home network, this address is its destination address. This step may lead to modification of the data packet. The modified data packet is then routed to its destination (step R3).

Consider a first implementation of the invention in which an outgoing call is set up to an IPv4 destination, for example an IPv4 web server on the Internet. A user terminal of the home gateway 2, for example the IPv6 PC 22 connected to the gateway 20, sends a data packet to this party in the IPv4 domain 3. In this situation, the application executed on the PC is an IPv6 browser. It must be remembered that the source user terminal 22 is a pure IPv6 terminal.

The following situations arise:
the user terminal 22 sends an IPv6 data packet using a source address equal to an IPv6 constructed address that has been assigned to it; or
the user terminal 22 sends an IPv6 data packet using a source address equal to an IPv6 native address that has been assigned to it.

Clearly the data packet contains an IPv6 destination address corresponding to the IPv4 destination that the terminal must have recovered beforehand.

The browser of the terminal 22 thus needs to know the IPv6 address of the destination web server. The web server is accessible only in IPv4. The terminal 22 must therefore have an IPv6 address that it considers the address of the web server (even though in reality the web server has only an IPv4 address).

To this end, a function for translating an IPv4 address of the web server into an IPv6 address must be implemented by the IP connectivity service provider or a third party. This translation function must conform to an IPv6 address construction formalism such that it contains the IPv4 address of the other party (the web server in this example). This translation function is described below with reference to FIG. 4.

This kind of translation function, here denoted DNS_IPv4toIPv6, may be executed by the access node 40 IPv6/IPv4_Access_Node of the IPv6 domain 1, for example, but on a more general level it is executed by a DNS server of the domain 1. The function DNS_IPv4toIPv6 is the default point of contact for any DNS resolution request sent by a requester terminal. By default, this function examines first IPv6 records of type "AAAA", in other words IPv6 native addresses. If a record is already present, a response is then sent to the requester terminal. If no record is present, a type A resolution request is then effected by the translation function DNS_IPv4toIPv6. On reception of a response from a DNS server containing the IPv4 address of the other party (the web server in this example), the function DNS_IPv4toIPv6 transforms the IPv4 address received in the response into an IPv6 address conforming to the formalism described with reference to FIG. 4 and retains this information in its cache.

Figure 4:
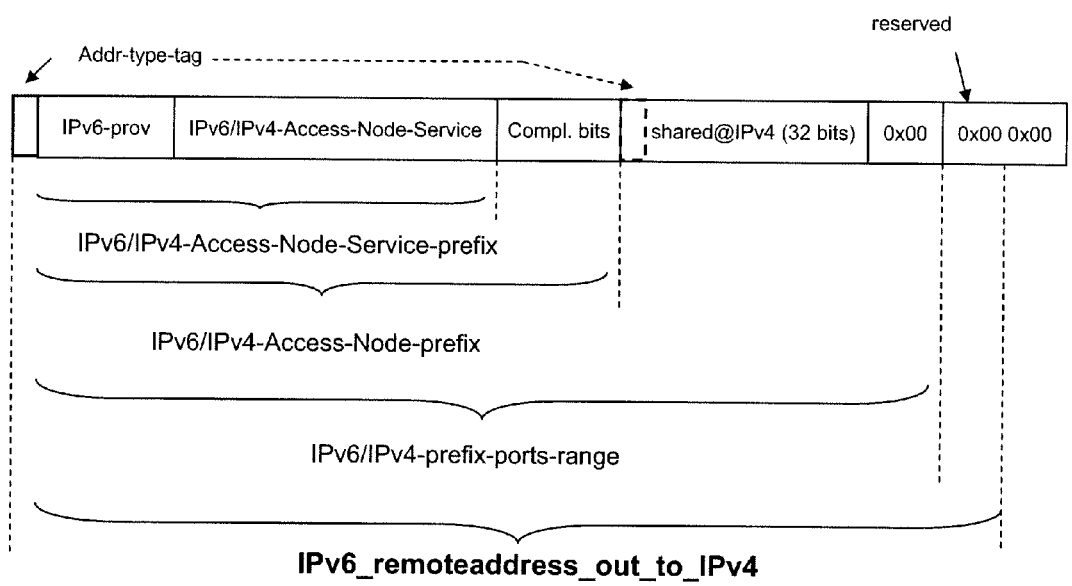
FIG. 4 shows the structure in a first implementation of the invention of an IPv6 address constructed from an IPv4 destination address and a destination port.

Note that the FIG. 4 example merely represents one implementation of the invention, what is essential being that the IPv4 address of the other party (here the web server) is inscribed in an IPv6 address. An error message is sent to the requester terminal if no response is received from a DNS server.

The destination address (here that of the web server) transformed in this way into an IPv6 address is denoted IPv6_remoteAddress_out_to_IPv4 below. Note that the requested terminal may recover an IPv6 address from the remote machine to be contacted by other means, for example from a server.

In any event, the IPv6 address of the other party (here the web server) may be an IPv6 native address or an IPv6 address conforming to the formalism introduced by the present invention. In the circumstance of a constructed address IPv6_remoteAddress_out_to_IPv4, it is included in the prefix IPv6/IPv4_Access_Note Service_prefix.

Referring to FIG. 4, note that the sequence of 2 bytes farthest to the right is marked "reserved" and set to 0 by default. This location corresponds to that of the port bits in an IPv6 address IPv4_in IPv6_dest_address for the packets intended for a user terminal. It is reserved in particular so that it is possible to indicate a port at which the other party (here the web server) wishes to be called. It could be an IPv4 other party that is also assigned an IPv4 address shared between a plurality of other parties and that would therefore not have access to all the available ports.

An IPv6 data packet containing the destination address IPv6_remoteAddress_out_to_IPv4 is then sent by the terminal 22.

Figure 5:
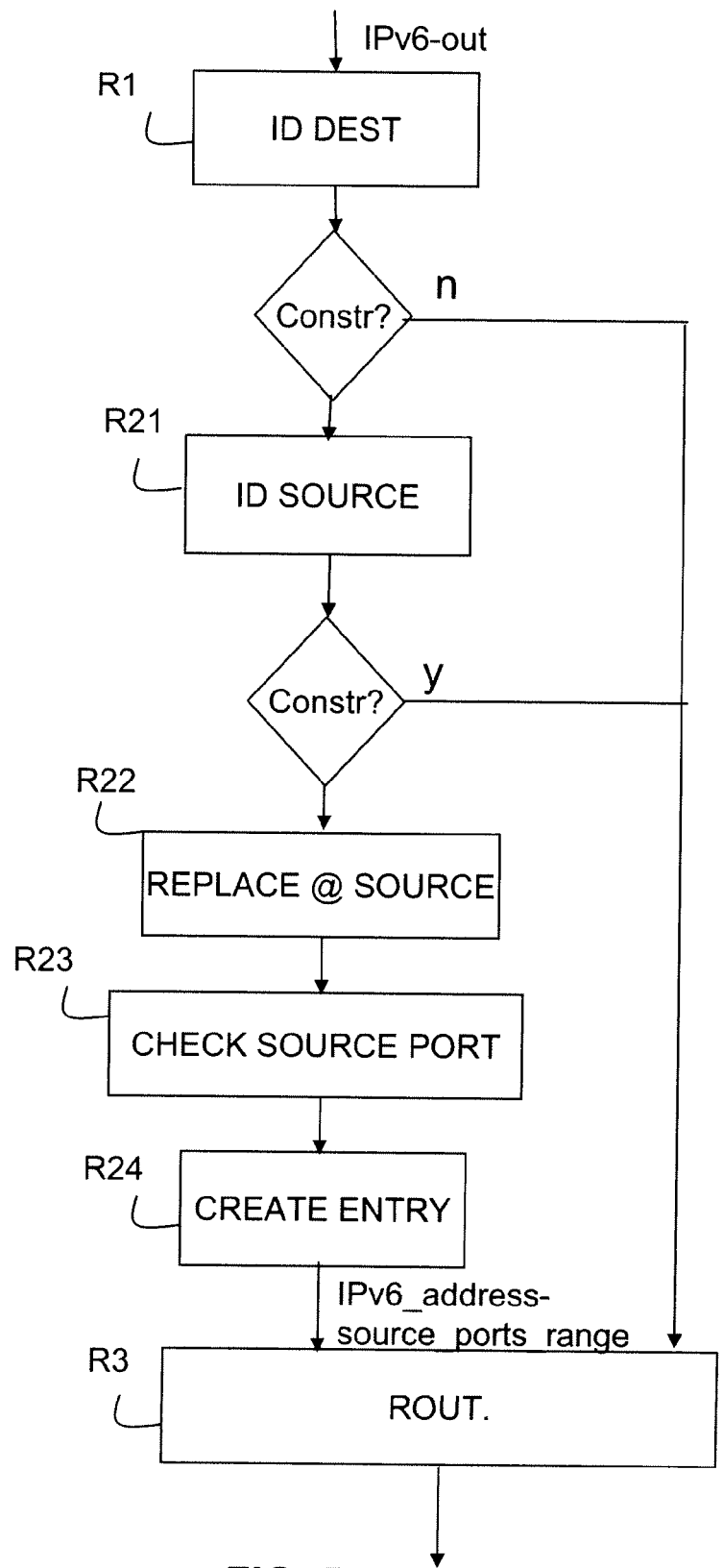
FIG. 5 shows the structure according to the invention of an IPv6 destination address constructed from an IPv4 address and a destination port for implementing the receiving method of the first implementation of the invention.

The home gateway 20 of the invention includes a device of the invention for receiving a data packet. On receiving the IPv6 packet, this device is adapted to execute the method of the first implementation of the invention of transmitting an IPv6 packet to an IPv6 address representing a machine connected to an IPv4 domain, as described below with reference to FIG. 5.

This method executes the IPv6 destination address identification step R1 described above.

One aspect of the invention is that the length of the prefix IPv4_Access_Node_Service_prefix is known to the home gateway 20, which is able to determine its value easily by taking the corresponding bits in its IPv6_prefix_ports_range. This kind of identification classifies an IPv6 destination address that is inscribed in the prefix IPv4_Access_Node_Service_prefix as a constructed address and considers all addresses not in this prefix to be native addresses.

An advantage of this identification process is that it is simple.

This identification method is valid only in the context of a single operator, however. For deployment on a wide scale with mutualisation of IPv4 and IPv6 domain interconnection nodes this method is no longer appropriate.

This kind of identification may entail searching a destination address for an identifier or tag whose value may represent a native address or a constructed address. As indicated in FIG. 4, for example, this kind of identifier ADDR_TYPE_TAG may have a length of only one bit having the value 0 or 1 to indicate that it is a native address or a constructed address. To facilitate reading, the identifier ADDR_TYPE_TAG may be placed at the beginning of the constructed IPv6 address, for example, or between IPv6/IPv4_Access_Node_Service_prefix and the IPv4 address.

An advantage of the identifier ADDR_TYPE_TAG is that it enables mutualisation of IPv4/IPv6 interconnection plant between operators and therefore costs sharing. Accordingly, an operator Oi may provide IPv4-IPv6 interconnection for a region Ri (with a set Pi of IPv4 prefixes). For the other operators Oj, only the addresses constructed by the operator Oi (based on the IPv4 prefixes) are visible, via BGP advertisements.

Clearly prefixes other than IPv6/IPv4 may exist, but they are not used to provide this connectivity service and the processing applied to them is that for an IPv6 native packet, i.e. they are routed directly to the IPv6 access router 30.

If the IPv6 destination address is classified as a constructed address, the transmission method of the invention executes a step R2 of regularizing the source address of the packet to be transmitted.

In this first implementation of the invention, this entails identifying in the step $R_{21}$ if the source address is a constructed address or a native address. An address is considered constructed if it is an IPv6 source address inscribed in IPv6/IPv4_Acess_Node_Service_prefix, all addresses not in this prefix being considered native source addresses. If the identifier ADDR_TYPE_TAG is used, an address is identified as constructed if the identifier ADDR_TYPE_TAG is set to "1".

If the source address is constructed, the data packet is routed to its destination in the step R3.

If the source IPv6 address is classed as a native address, the method of the invention executes, before this routing step, a step $R_{22}$ for choosing an IPv6 constructed source address whose source port number is in the authorized range ports_pattern/length_of_unvariable assigned to the gateway 20 and modifies the data packet by replacing the native source address with this constructed address. In the step $R_{24}$, the method of the invention creates an entry in the address translation table of the gateway associating the native source address and the source address constructed in this way.

Figure 6:
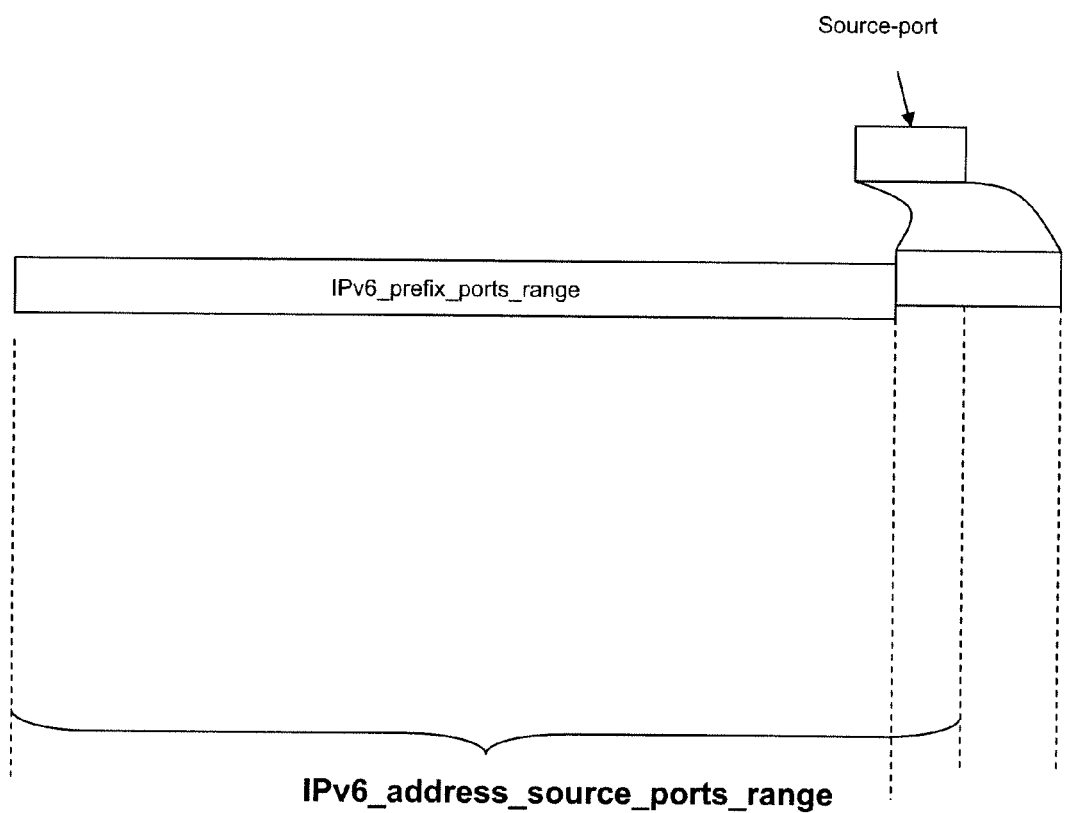
FIG. 6 shows the structure of an IPv6 source address constructed from an IPv4 source address and a source port for implementing the receiving method of the first implementation of the invention.

The method of the invention may advantageously further verify in the step $R_{23}$ that the source port number contained in the constructed source address and the transport level source port number of the data packet match. Referring to FIG. 6, it is seen that this entails taking any 128-bit IPv6 address IPv6_prefix_ports_range and copying into its 16 right-hand bits of the data packet to be transmitted the bits of the source port used (the TCP or UDP port of the IPv6 packet received from the terminal 22).

It is clear that this step is necessary for the IPv6/IPv4 access node 40 to be able to translate the IPv6 data packet into an IPv4 data packet before routing it to the destination IPv4 domain. This has another advantage if the IPv4 address assigned to the home gateway 20 is an address shared by a plurality of home gateways of the IPv6 domain 1. As mentioned above, the home gateway 20 can use only source port numbers belonging to a restricted range of port numbers reserved for it.

Note also that if the home gateway 20 constrains the source port to be in the range of authorized port numbers ports_pattern/length_of_unvariable, the constructed source address:
  is inscribed in IPv6_prefix_ports_range; and
  has its last 16 bits identical to the source port number of the IPv6 packet received by the gateway from the terminal.

The IPv6 source address formed in this way is denoted IPv6_address_source_ports_range below.

The IPv6 packet containing the constrained source IPv6 address IPv6_address_source_ports_range is routed to the IPv6 access router 30 that serves the gateway in the step R3.

The IPv6 access router 30 verifies that the IPv6 source address IPv6_address_source_ports_range is authorized for the home gateway 20. In other words, it verifies that there is no spoofing, i.e. that the home gateway 20 sends IPv6 packets in its authorized prefix range IPv6_prefix_ports_range. For this the IPv6 access router 30 verifies that the IPv6 source address IPv6_address_source_ports_range of the IPv6 packet received from the gateway 20 is inscribed in the prefix IPv6_prefix_ports_range assigned to this home gateway. This verification is effected in a standard manner in accordance with a principle already used for IPv6 native traffic.

If the result of this verification is positive, the IPv6 access router 30 routes the IPv6 packet towards its destination.

Because the IPv6 destination address is inscribed in the prefix IPv6/IPv4_Access_Node_prefix characterizing the node IPv6/IPv4_Access_Node 40 providing access to the IPv6 domain, the data packet is routed towards that access node. It is assumed, for example, that a node of this kind is placed in the IPv6 domain 1 as close as possible to the IPv4 domain or domains that it serves in order to optimize the routing of data packets to these domains, but the invention is not limited to any such location of the access node 40, which may be located anywhere in the domain 1.

Figure 8:
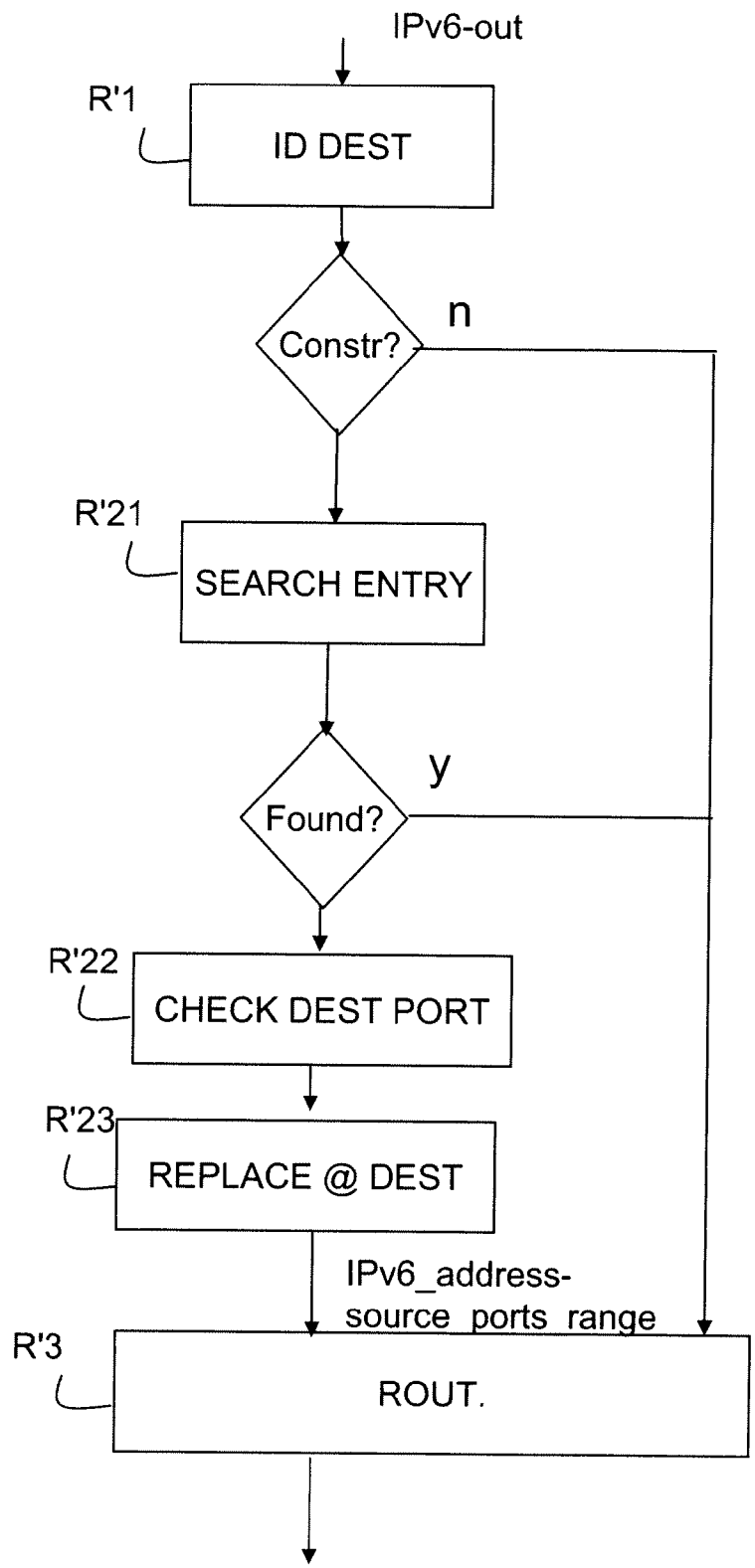
FIG. 8 shows diagrammatically steps of receiving a data packet in an IPv6 domain interconnected with an IPv4 domain in the second implementation of the invention.
Figure 9:
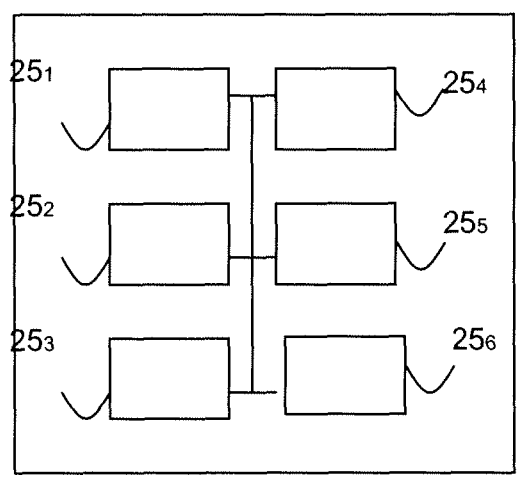
FIG. 9 shows diagrammatically the structure of a device of the invention for receiving a data packet in an IPv6 domain.

On reception of the IPv6 packet, the access node IPv6/IPv4_Access_Node 40 routes the outgoing data packet to an IPv4 domain the following manner:
  it extracts an IPv4 destination address and a destination port from the IPv6 destination address and an IPv4 source address and a source port from the IPv6 source address;
  it then translates the IPv6 packet into an IPv4 packet that has the following characteristics:
    its IPv4 source address is the IPv4 address shared@IPv4 of the home gateway 20; it is this address shared@IPv4 that the destination of the transmitted IPv4 data packet (i.e. the web server) will see; remember that this IPv4 address shared@IPv4 is included in the prefix IPv6_prefix_ports_range and thus in the source IPv6 address IPv6_address_source_ports_range; referring to FIG. 8, the IPv4 address Shares_@IPv4 may be extracted from bits 24 to 55;
    its IPv4 destination address is the IPv4 address of the other party; referring to FIG. 4, the IPv4 destination address may be extracted from bits 24 to 55 of the address IPv6_remoteAddress_out_to_IPv4 of the IPv6 data packet received by the access node 40;
    the source port number of the translated IPv4 data packet is the number of the source port of the IPv6 packet received;
    the destination port number of the translated IPv4 data packet is the same as that of the IPv6 packet;
    the payload part of the IPv6 packet is the payload part of the translated IPv4 packet;
  finally, it routes the translated IPv4 packet to its destination (the IPv4 web server in this example).

Note that the fields of the header of the IPv6 packet are translated into corresponding IPv4 fields in a standard manner, for example according to the principles of the Network Address Translation-Protocol Translation (NAT-PT) standard.

Clearly, if the IPv4 address assigned to the home gateway 20 is a public address shared between a plurality of gateways, it is necessary for the source port number contained in the IPv6 constructed source address of the received data packet to belong to the range of port numbers reserved for this gateway; if this were not so, the access node could translate the IPv6 packet to be transmitted into an IPv4 data packet, but any response packets sent by the destination entity would not reach the home gateway.

The access node 40 advantageously verifies that the source port belongs to the range of source port numbers assigned to the gateway 20 by checking that the last 16 bits of the IPv6 source address of the packet are identical to the 16 bits of the source port in the corresponding TCP or UDP field of the IPv6 packet. This indirect verification may be carried out following verification by the access router that the home gateway has sent a packet whose source address is in its prefix. After these two steps, it is certain that the home gateway 20 has sent a data packet containing a source port included in its range of authorized ports and did not use that of another home gateway.

A second implementation of the invention addresses the situation of a data packet IPv4-in-pt entering an IPv6 domain from an IPv4 domain when the destination terminal, for example the user terminal 21, is in the IPv6 domain 1. The user terminal is behind the home gateway 20 that has an IPv4 address @IPv4 or shared@IPv4 and a range of authorized ports ports_pattern/length_of_unvariable.

If it is for the user terminal 21 of the home network of the home gateway 20, the incoming packet IPv4-in-pt contains the IPv4 destination address shared@IPv4 and a destination port inscribed in the range of authorized port numbers of the home gateway 20 ports_pattern/length_of_unvariable.

As mentioned above with reference to FIG. 2, the address shared@IPv4 and the range of port numbers ports_pattern/length_of_unvariable are found in the prefix IPv6_prefix_ports_range of the home gateway 20.

The packet IPv4-in-pt is received by the access node 40. In a preliminary step, the IP connectivity provider advertises to the IPv4 domains with which it has an interface the IPv4 addresses assigned to home gateways of the domain 1 to which it is responsible for routing the IPv4 packets. It effects this advertisement either via the access node 40 itself or an Autonomous System Border Router (ASBR) using a technique known to the person skilled in the art.

Figure 7:
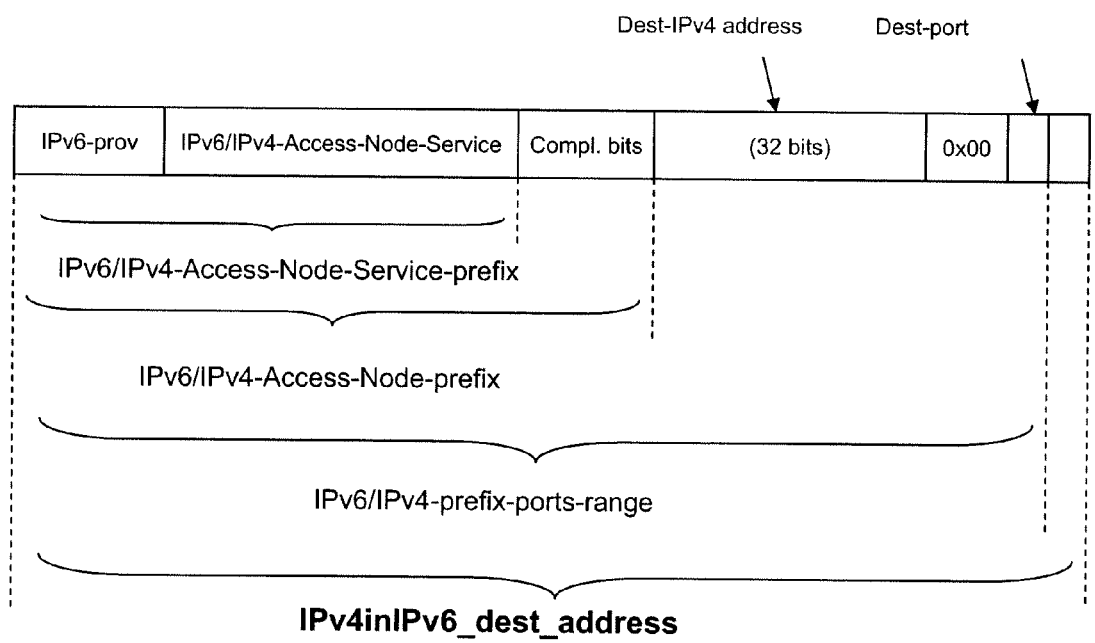
FIG. 7 shows the structure in a second implementation of the invention of an IPv6 address constructed from an IPv4 address and a destination port.

The packet IPv4-in-pt contains a destination address @IPv4 or shared@IPv4 managed by the access node 40 and a destination port dest-port. The access node 40 constructs an IPv6 destination address IPv4in IPv6_dest_address by concatenating a prefix IPv6/IPv4_Access_Node_prefix of the access node 40, said IPv4 destination address shared@IPv4, and the destination port number dest-port, as described with reference to FIG. 7.

The destination port number dest-port is inserted into the right-hand part of the IPv6 constructed destination address. It therefore inserts both the 32 bits of the destination IPv4 address of the received IPv4 packet and the 16 bits of the destination port dest-port to constitute an IPv6 constructed destination address IPv4in IPv6_dest_address.

The access node 40 thereafter generates an IPv6 data packet IPv4in IPv6-pt from the IPv6 constructed destination address IPv4in IPv6_dest_address and the received IPv4 data packet. In one implementation the received IPv4 packet is translated into an IPv6 packet:

whose IPv6 source address is one of the IPv6 addresses available to the IPv6/IPv4_Access_Node 40 for itself (for one of its interfaces); and whose IPv6 destination address is the address IPv4in IPv6_dest_address.

In another implementation the received IPv4 packet IPv4-in-pt is translated into an IPv6 packet with which the construct IPv6 address is associated after first extracting from the received IPv4 packet its destination IPv4 address, its destination port, its source IPv4 address, and its source port.

The IPv6 data packet IPv4in IPv6-pt generated using the IPv6 constructed destination address is routed in the IPv6 domain 1. It then enters the IPv6 routing core of the access node 40 IPv6/IPv4_Access_Node.

By construction, its destination address IPv4in IPv6_dest_address is inscribed in the prefix IPv6_prefix_ports_range of the home gateway 20. The packet IPv4in IPv6-pt is routed to the interface of the access node IPv6/IPv4_Access_Node 40 that serves the corresponding IPv6 route to the home gateway 20.

Note that if IPv4in IPv6_dest_address were not inscribed in any prefix IPv6_prefix_ports_range (or any encompassing prefix), the packet would be destroyed en route as it could not be routed to any prefix IPv6_prefix_ports_range and thus to any home gateway.

If the destination address IPv4in IPv6_dest_address is inscribed in the prefix IPv6_prefix_ports_range, the packet IPv4in IPv6-pt reaches the dual-stack access router 30 serving the home gateway 20 hosting the user terminal 21 in its home network 20. It is routed by the dual-stack access router 30 to the home gateway, which knows the route to the prefix IPv6_address_source_ports_range.

In this second implementation of the invention, the home gateway 20 includes a device using the method of the invention of receiving the data packet IPv4in IPv6-pt. A method of this kind is described below with reference to FIG. 8.

When the packet IPv4in IPv6-pt reaches the home gateway 20, the gateway executes the step R'1 described above of identifying the destination address.

If a native destination address is identified, the data packet is routed directly to the destination user terminal in a step R'3.

If a constructed destination address is identified, for example with the aid of an identifier contained in the destination address, the step of regularizing the method of the invention of receiving a data packet includes a step R'$_{21}$ of searching the translation table of the home gateway for an entry containing the constructed destination address. If the result of this search is positive, an entry of this kind associates with the constructed destination address a native destination address IPv6_address_native_Ue of the destination terminal. In the step R'$_{23}$, the method of the invention replaces the constructed destination address in the IPv6 data packet with this native address. This is particularly advantageous if the data packet IPv4-in-pt is part of a response to a data packet sent beforehand by the destination terminal 21 with its IPv6 native source address, for which the gateway stored this native address in its NAT table before sending it, as described with reference to the previous implementation of the invention. At that time it created the entry in its translation table and replaced the native address of the terminal 21 with the constructed address to enable the access node 40 to extract an IPv4 source address from it when transforming the outgoing IPv6 packet into an IPv4 packet.

The step of regularizing the method advantageously further includes a step R'22 of verifying that the transport level destination port of the data packet agrees with the destination port number contained in the destination address of the packet. If the two port numbers do not agree, the packet is rejected. This must not occur if the translation was effected by the access node but this step may be used for monitoring streams coming from the access node.

In the step R'3, the gateway routes the data packet to the destination terminal in its home network.

In the example described with reference to FIG. 1, the home gateway 20 of the invention includes a device 25 that is described below with reference to FIG. 10 for receiving a data packet in an IPv6 domain. It includes the hardware elements conventionally found in a standard computer or a dedicated router, namely a processor $25_1$, a random-access memory (RAM) $25_2$, a read-only memory (ROM) $25_3$, and telecommunications means $25_4$ for communicating with the network 1.

According to the invention, the device 25 includes a memory $25_5$ containing a database in which is stored an address translation table (NAT table) for translating addresses between the domain 1 and its home network 3.

Note that this memory may equally well be external to the device 25 provided that said device can access it.

The read-only memory 25$_5$ constitutes a storage medium of the invention that stores the computer program of the invention. The program includes instructions for executing the steps of the method of the invention of receiving an incoming packet described above with reference to FIGS. 3, 5, and 8.

Note also that the receiver device may equally well be included in a user terminal connected directly to the network 1 of the connectivity service provider.

To summarize, the invention makes possible a second phase of migration of IP connectivity services towards IPv6 using packet routing mechanisms that takes the following factors into account:

The final migration to IPv6 will take a plurality of years (a minimum timescale of 10 years), mainly because of the large number of participants to "convince" to go over to IPv6, the large number of autonomous systems (AS), of which there are more than 17,000, and the diversity of interconnection mechanisms. Moreover, it should be pointed out that the address problem is a priori of concern only to operators. Clients have no reason to modify the architecture of their local networks. An enterprise "John Doe" has no motivation for migrating its FTP, HTTP, etc. servers to IPv6. Operators must expect a long haul to accompany the changeover to IPv6.

Service operators suffer a problem of running out of IPv4 addresses, as described above.

Simply migrating a given domain to IPv6 does not solve the problem of global connectivity (contacting any remote machine present on the Internet). Interconnection with the IPv4 world must therefore be provided.

A solution based on NAT-PT that is not stateless is not to be recommended. This would degrade the service provided as value-added services linked to port forwarding configured by clients would not work and would depend on the behavior of the "black box" interconnecting an IPv4 cloud and an IPv6 cloud.

The mechanisms of the invention for routing IP packets make it possible to encourage the use of the IPv6 protocol in the following manner: activating IPv6 and providing a solution making it possible to encourage IPv6 traffic based on a stateless interconnection function placed in the network. The solution of the invention uses only the IPv6 connectivity of home gateways and implies the use of IPv6 home gateways and user terminals. Because of this, these equipments are in a position to process (send and receive) only IPv6 data packets.

The solution of the invention makes it possible:

for the access network to be pure IPv6 and therefore the access operator not to have to manage access IPv4 routing;

for the home gateways to have no concept of IPv4 and to manage only IPv6;

for the terminals of the home network of the home gateway to use only IPv6.

The same IPv4 address may be assigned to a plurality of home gateways (or other equipments in contexts other than domestic Internet access). This means a dummy assignment at home gateway level, as home gateways do not manage IPv4 routing. The basic principles are as follows:

range of authorized source ports at each gateway for outgoing calls;

particular IPv6 prefix IPv6_prefix_ports_range.

IPv4 packets entering the IPv6 domain are translated into IPv6 packets, rather than being encapsulated by the IPv6/IPv4_Access_Node to be routed to the home gateway.

For outgoing calls, on DNS resolution of an IPv4 called party, an IPv6 address is returned to the initiator user terminal that was constructed on the basis of the IPv4 address of the called party. The user terminal then uses this IPv6 destination address to send data packets. It may use its IPv6 native or constructed source address to send packets.

If it uses its native source address, the home gateway transforms the IPv6 native source address into an IPv6 constructed source address containing its own IPv4 address shared between the gateways (shared@IPv4) and the source port (inscribed in the authorized source range).

An equipment interconnecting the IPv6 domain and the IPv4 domain verifies that the home gateway has used its range of authorized source ports by comparing the part of the source address that contains the source port bits and the source port in the port field of the IPv6 packet. It translates the IPv6 packet into an IPv4 packet to transmit it to the called party using:

for the IPv4 source address, the bits in the IPv6 source address that contain shared@IPv4;

for the IPv4 destination address, the bits in the IPv6 address that contain the IPv4 address of the called party.

The invention claimed is:

1. A method for receiving an IPv6 data packet in an IPv6 domain connected to an IPv4 domain, said packet comprising an IPv6 destination address and an IPv6 source address, said method being executed in a home gateway adapted to connect a user terminal to said IPv6 domain, and comprising the following steps:

identifying an IPv6 destination address constructed by concatenating an IPv6 prefix, an IPv4 destination address and a destination port number;

if necessary, regularizing at least one of the IPv6 source address and the IPv6 destination address of the data packet by replacing said at least one IPv6 address, the replacement process belonging to a group comprising replacement of a constructed address with a native address and replacement of a native address with a constructed address, and modifying the data packet using the regularized address; and routing the modified data packet to its destination.

2. The method according to claim 1, wherein when the data packet comes from said user terminal and goes to the IPv4 domain, the step of regularizing the source address further comprises the following steps:

identifying an IPv6 native source address;

creating an entry in an address translation table, said entry associating said native source address with a source address constructed by concatenating an IPv6 prefix, an IPv4 address assigned to the gateway, and a source port number belonging to a range of port numbers authorized for said gateway; and replacing the native source address of the data packet with the constructed source address.

3. The method according to claim 2, wherein address identification uses an identifier contained in the destination address.

4. The method according to claim 2, further comprising a step of verifying that the source port number of the data packet and the source port number of the constructed source address match.

5. The method according to claim 1, wherein when the data packet comes from the IPv4 domain and goes to said user terminal, the step of regularizing the destination address comprises the following steps:

searching an address translation table of the gateway for an entry associating with said constructed destination address a native destination address;

if an entry is found, replacing the constructed destination address of the data packet with the native destination address from that entry.

6. The method according to claim 5, further comprising a step of verifying that the destination port number of the data packet and the destination port number contained in the constructed destination address match.

7. A non-transitory computer program product that is at least one of downloadable from a communications network and stored on a computer-readable medium and executable by a microprocessor, comprising program code instructions for executing the method according to claim 1 of receiving a data packet in an IPv6 domain.

8. A device for receiving an IPv6 data packet in an IPv6 domain connected to an IPv4 domain, said packet comprising an IPv6 destination address and an IPv6 source address, said device for use in a home gateway adapted to connect a user terminal to said IPv6 domain, comprising:

means for identifying an IPv6 destination address constructed by concatenating an IPv6 prefix, an IPv4 destination address, and a destination port number;

means for regularizing, if necessary, at least one of the IPv6 source address and the IPv6 destination address of the data packet by replacing said at least one IPv6 address, the replacement process belonging to a group comprising replacement of a constructed address with a native address and replacement of a native address with a constructed address, and modifying the data packet using the regularized address; and means for routing the modified data packet to its destination.

9. A home gateway adapted to connect user terminals of a home network to an IPv6 domain connected to an IPv4 domain, comprising:

means for obtaining an IPv4 address, a range of port numbers authorized for said gateway, and a range of IPv6 addresses authorized for said gateway, said range of IPv6 addresses being constructed by concatenating an IPv6 prefix, said IPv4 address, and the range of authorized IPv4 port numbers; and a device according to claim 8 for receiving an IPv6 data packet in the IPv6 domain connected to the IPv4 domain.

10. A home gateway according to claim 9, comprising an address translation table containing entries associating at least one source address for a communications session involving a user terminal of its home network, wherein said gateway is adapted to store in said entry an IPv6 constructed source address and an IPv6 native source address.

* * * * *

UNITED STATES PATENT AND TRADEMARK OFFICE
CERTIFICATE OF CORRECTION

PATENT NO. : 8,451,845 B2
APPLICATION NO. : 13/001907
DATED : May 28, 2013
INVENTOR(S) : Mohamed Boucadair and Jean-Luc Grimault It is certified that error appears in the above-identified patent and that said Letters Patent is hereby corrected as shown below:

IN THE SPECIFICATION:

Column 5, line 38, replace "contained in the constructed destination." with --contained in the constructed destination address match.--

IN THE CLAIMS:

In Claim 1, Column 18, line 42, replace "routing the modified data packet to its destination" with --routing the IPv6 data packet to its destination--

In Claim 8, Column 20, lines 6-7, replace "means for routing the modified data packet to its destination" with --means for routing the IPv6 data packet to its destination--

Signed and Sealed this
Tenth Day of February, 2015

Michelle K. Lee
*Deputy Director of the United States Patent and Trademark Office*